United States Patent
Mikol

(10) Patent No.: US 6,464,265 B1
(45) Date of Patent: Oct. 15, 2002

(54) MODULAR SHOWER ARM MOUNTING SYSTEM

(75) Inventor: Erwin F. Mikol, The Villages, FL (US)

(73) Assignee: Moen Incorporated, North Olmsted, OH (US)

( * ) Notice: Subject to any disclaimer, the term of this patent is extended or adjusted under 35 U.S.C. 154(b) by 0 days.

(21) Appl. No.: 09/422,773

(22) Filed: Oct. 22, 1999

(51) Int. Cl.[7] .................................................. F16L 15/00
(52) U.S. Cl. ........................ 285/333; 285/390; 285/355; 239/282
(58) Field of Search .............................. 285/333, 355, 285/390; 239/282

(56) References Cited

U.S. PATENT DOCUMENTS

| | | | |
|---|---|---|---|
| 238,300 A | | 3/1881 | Mattullath |
| 1,548,570 A | * | 8/1925 | Wuesthoff ........................ 4/615 |
| 1,562,982 A | * | 11/1925 | Muend ............................ 4/615 |
| 1,597,477 A | | 8/1926 | Panhorst |
| 1,665,436 A | | 4/1928 | Bloch |
| 1,724,161 A | * | 8/1929 | Wuesthoff ........................ 4/615 |
| 1,790,316 A | * | 1/1931 | Muellef ........................... 4/615 |
| 1,835,301 A | | 12/1931 | Hennessey |
| 2,997,058 A | | 8/1961 | Hall |
| 3,136,570 A | * | 6/1964 | Lee ................................. 4/678 |
| 3,371,679 A | | 3/1968 | Minella |
| 3,392,746 A | * | 7/1968 | Young ........................... 239/282 |
| 3,564,621 A | | 2/1971 | Fletcher |
| 3,637,143 A | * | 1/1972 | Shames et al. ............. 239/283 |
| 3,971,401 A | | 7/1976 | Persson |
| 4,463,460 A | | 8/1984 | Arnold et al. |
| 4,793,331 A | * | 12/1988 | Stewart ........................ 128/66 |
| 4,907,828 A | * | 3/1990 | Chang ........................... 285/355 |
| 5,195,553 A | | 3/1993 | Wright |
| 5,275,199 A | | 1/1994 | Howell |
| 9,175,972 | * | 1/2001 | Wales ............................. 4/678 |
| 6,192,529 B1 | * | 2/2001 | Jones et al. .................. 239/282 |
| 6,276,004 B1 | * | 8/2001 | Bertrand et al. ............. 239/282 |

* cited by examiner

Primary Examiner—Lynne H. Browne
Assistant Examiner—Kenn Thompson
(74) Attorney, Agent, or Firm—Cook, Alex, McFarron, Manzo, Cummings & Mehler, Ltd.

(57) ABSTRACT

A modular shower arm mounting system includes a water conduit and a replaceable shower arm assembly in sealing engagement therewith. The water conduit has a generally uniform inner wall and an outer diameter wall having a hexagonally or polygonally shaped drive force receiving area adjacent a threaded area. The conduit has one end attached to a manifold behind a shower wall surface and an outlet end projecting from the wall surface of sufficient length therefrom so that the drive force receiving area and threaded area are spaced from the wall surface. The replaceable shower arm assembly has an inner wall with a threaded portion for engagement with the conduit and a substantially smooth portion of gradually decreasing inner diameter downstream of said threaded portion approaching an outwardly projecting end thereof. The seal ring is adjacent the outlet end of the conduit to form a seal with the assembly. The shower arm assembly is replaceable without disconnecting the conduit from the manifold thereby allowing the user to easily change the shape and/or color of the visible shower arm assembly.

6 Claims, 1 Drawing Sheet

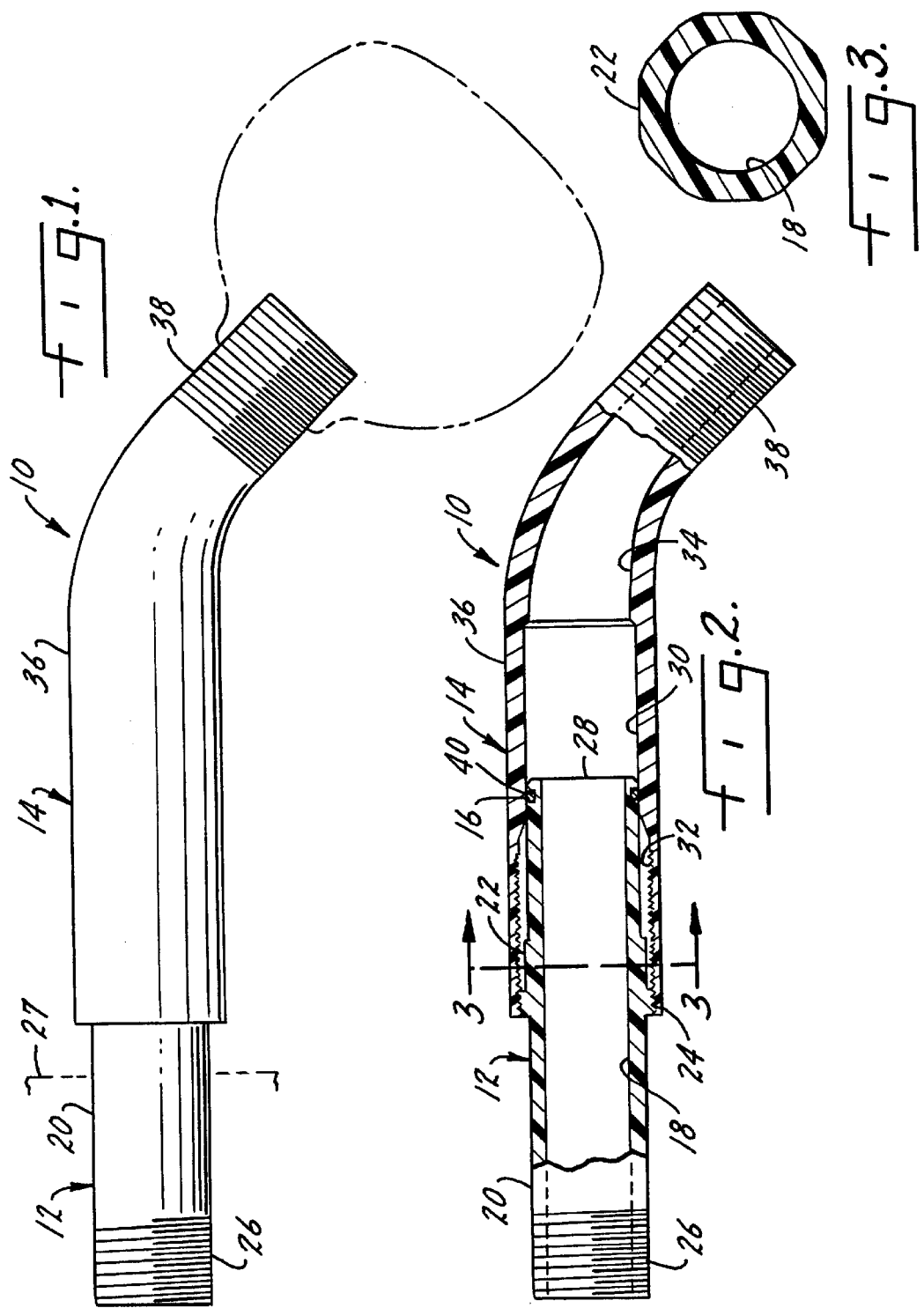

MODULAR SHOWER ARM MOUNTING SYSTEM

FIELD OF THE INVENTION

The present invention relates to a modular mounting system for plumbing fixtures such as shower arms. In prior art shower arm mounting systems, there may a shower arm which serves to support and position the shower head, but conventionally there may be an undesirable degree of difficulty in removing the shower arm when the user wants to change the style or color of bathroom fixtures. A principal problem with current shower arm assemblies is that there is no way for the user to replace the visible portion of the assembly without disconnecting a manifold attached to the shower riser inside a wall. Thus, people desiring to enhance the aesthetic style of their bathroom fixtures cannot remove the entire visible portion of the shower arm without great difficulty.

The present invention provides a modular shower arm mounting system which supports the shower arm assembly and allows for replacement of the visible portion of the shower arm assembly without requiring disconnection of the manifold or causing water to leak behind the wall. Thus, the user may remove the old assembly and replace it with a new assembly which has a more desirable style.

SUMMARY OF THE INVENTION

The present invention relates to a shower arm mounting system.

A primary purpose of the invention is to provide a modular shower arm mounting system a portion of which is replaceable without the difficulty associated with disconnecting parts from behind the wall so that the user may easily replace the shower arm assembly.

Another purpose of the invention is to provide a replaceable shower arm assembly which forms all or a substantial part of the visible portion of the modular shower arm mounting system.

Another purpose of the invention is to provide a replacement shower arm assembly which avoids potential water leakage from occurring behind the shower wall.

Another purpose of the invention is a modular shower arm mounting system as described which provides for a firm mounting of the replaceable shower arm assembly.

Other purposes will appear in the ensuing specification, drawings and claims.

BRIEF DESCRIPTION OF THE DRAWINGS

The invention is illustrated diagrammatically in the following drawings wherein:

FIG. 1 is a side view of the shower arm mounting system with an attached shower head.

FIG. 2 is a partial vertical section of the mounting system shown in FIG. 1; and FIG. 3 is a section along plane 3—3 of FIG. 2.

DETAILED DESCRIPTION OF THE PREFERRED EMBODIMENT

The present invention relates to a modular shower arm mounting system which provides for the replacement of the visible portions of the shower assembly. The invention further provides for the replacement of the shower arm assembly without requiring any disconnections behind the shower wall to minimize water leakage.

In FIG. 1 and FIG. 2, the modular shower arm mounting system 10 includes a water conduit 12, a replaceable shower arm assembly 14 and an O-ring 16.

The water conduit 12 has a generally uniform inner diameter 18 and an outer diameter 20 with a hexagonally shaped portion 22 adjacent a threaded area 24. The conduit 12 has one end 26 threadably attached to a manifold behind the shower wall 27 and an outlet end 28 projecting from the wall 27 a sufficient distance such that the hexagonally shaped portion 22 and threaded portion 24 are spaced away from the wall 27. The conduit 12 is connected to the manifold and thus provides a firm support for the visible elements of the shower assembly. FIG. 3 shows the hexagonally or polygonally shaped portion 22 which serves as a drive or tool engaging surface to allow the conduit 12 to be tightened to the manifold. The threaded area 24 provides for threaded engagement with the replaceable shower arm assembly 14.

It is preferred that all or a substantial portion of the conduit 12 which projects from the wall be located within the replaceable shower arm assembly 14 so that only the replaceable elements are visible. It is also preferred that the threaded portion 24 of the conduit be located adjacent the wall with the hexagonally shaped portion 22 being located adjacent and downstream thereof so that in assembly the replaceable shower arm assembly 14 passes over the hexagonally shaped portion 22 and threadably engages the threaded portion 24.

The replaceable shower arm assembly 14 has an inner wall 30 which has both a threaded portion 32 and a substantially smooth portion 34. The outer diameter 36 of the assembly 14 gradually decreases from adjacent the wall 27 toward an outwardly projecting end 38. The threaded portion 32 of the inner wall 30 is several times longer than the threaded portion 24 of the conduit 12 so that the shower arm assembly 14 may be continually tightened on the conduit 12 until the shower arm assembly is adjacent the wall with the shower arm assembly forming all or substantially all of the visible portion of the mounting system 10. The substantially smooth portion 34 of the inner wall 30 gradually decreases downstream of the threaded portion 32 as the inner wall approaches the outwardly projecting threaded end 38. A portion of the outwardly projecting end 38 may be angled down with respect to the rest of the shower arm assembly 14 so that projecting end is directed towards the user. As shown in FIG. 1, the projecting end 38 may threadably mount a shower head shown in phantom.

The O-ring 16 is adjacent the outlet end 28 of the conduit 12 and is positioned in an appropriately sized groove 40 to form a seal between the assembly 14 and the conduit 12.

Because all or a substantial portion of the conduit 12 which projects beyond the wall is positioned within the replaceable shower arm assembly 14, a user desiring to change the appearance of the fixture need only replace the shower arm assembly 14. The assembly 14 is configured for easy and convenient removal so that the style and/or color of the shower arm may be conveniently changed by the user without the complication associated with behind the wall connections. The user merely threadably removes the old shower arm assembly without disconnecting the conduit from the manifold. Then the new shower arm assembly with the desired aesthetics and a similar threadable configuration to the old shower arm assembly is engaged with the conduit until the shower arm assembly is adjacent the wall. Thus, the visible portion of the modular shower arm mounting system may be replaced with any style that is desired by the user.

Whereas the preferred form of the invention has been shown and described herein, it should be realized that there may be many modifications, substitutions and alterations thereto.

What is claimed is:

1. A modular shower arm mounting system, including:

(a) a rigid water conduit formed and adapted to mount to a water manifold located behind a shower wall, said conduit having an inner water passage and an exterior wall, said exterior wall having formed thereon a first threaded area for connection to the manifold and having formed thereon a second threaded area remote from the first threaded area and positioned on a visible side of the shower wall when the water conduit is mounted to the water manifold, a polygonally shaped drive force receiving area on said exterior wall near said second threaded area and being positioned on the visible side of the shower wall when the water conduit is mounted to the water manifold, the drive force receiving area providing for mounting of the water conduit to the water manifold from the visible side of the shower wall;

(b) a replaceable shower arm assembly having an inner wall with a threaded portion for engagement with the second threaded area of the water conduit and a substantially smooth portion downstream of said threaded portion terminating in an outwardly projecting end thereof, said assembly extending over and masking said drive force receiving area when threadably attached to the water conduit, a seal ring adjacent the outlet end of the water conduit in sealing engagement with said assembly inner wall, an exterior wall of said assembly being threaded on an outlet end thereof for attachment of a shower head; and (c) said assembly covering and masking said conduit when attached thereto and having an end thereof directly adjacent the shower wall when attached to the conduit, said assembly being removable and replaceable to change the appearance thereof without disconnecting the conduit from the manifold.

2. The modular shower arm mounting system of claim 1, wherein the conduit second threaded area is directly adjacent said drive force receiving area.

3. The modular shower arm mounting system of claim 2, wherein the second threaded area has a larger diameter than the drive force receiving area.

4. The modular shower arm mounting system of claim 1, wherein the drive force receiving area has a hexagonal configuration.

5. The modular shower arm mounting system of claim 1, wherein the outer end of the water conduit carries the seal ring for engagement with a reduced diameter portion of the assembly inner wall.

6. The modular shower arm mounting system of claim 1, wherein a portion of the assembly is disposed at a downward angle for directing water toward a user of the shower head.

* * * * *